March 11, 1952     N. WYETH     2,588,682

SHOCK ABSORBER

Filed April 22, 1946     2 SHEETS—SHEET 1

INVENTOR.
Nathaniel Wyeth.
BY
Harness and Harris
ATTORNEYS.

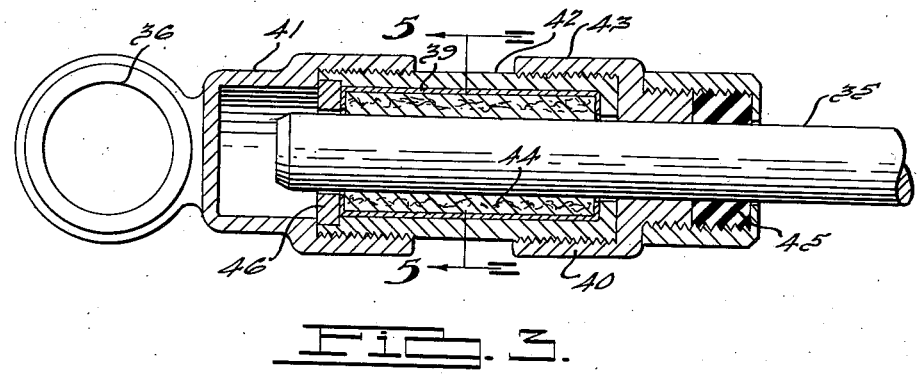

Patented Mar. 11, 1952

2,588,682

UNITED STATES PATENT OFFICE 2,588,682

SHOCK ABSORBER

Nathaniel Wyeth, Detroit, Mich., assignor to Chrysler Corporation, Highland Park, Mich., a corporation of Delaware Application April 22, 1946, Serial No. 664,096

2 Claims. (Cl. 267—1)

My invention relates to shock absorbers and more particularly to shock absorbers installed in stabilizing struts and tie rods of motor vehicles.

It is an object of my invention to provide a shock absorber of simple construction which may be economically manufactured. It has been the practice to make devices of this nature of the hydraulic type which utilize a cylinder, a piston, a fluid, and various combinations of valves and restricted openings. It is believed that these devices are unduly complicated and expensive to manufacture. I propose to utilize the friction between two relatively movable members to yieldingly restrain relative motion between them.

It is a further object of this device to provide a shock absorber construction which can be used in the stabilizing strut commonly used as a transverse connecting rod between the vehicle's sprung portion (usually its frame) and the unsprung portion or rear axle and which, with but slight modification, can be installed in the tie rods or linkage connecting the vehicle steering mechanism with the front wheel mountings.

Another object of my invention is to provide a flexible coupling for the front wheel steering mechanism which dampens wheel shake. The coupling will give but not recoil and vibrate. The dampened wheel shake is not transferred to the other wheel.

A further object of my invention is to provide a stabilizer strut to yieldably check side sway of the vehicle sprung portion relative to the unsprung portion. This strut extends laterally across the rear portions of the vehicle with one end fastened to the vehicle frame and the other end fastened to the rear axle.

The shock absorber construction described herein is not limited in application to vehicle tie rods and stabilizer struts, but these are representative uses of the shock absorber. Other uses could also be found but my description will, for the sake of brevity, limit itself to these applications.

In the drawings:

Fig. 5 is a section on the line 5—5 of Fig. 3;

Fig. 6 is a section on the line 6—6 of Fig. 1 showing the construction of the shock absorber used in the front wheel tie rods;

Fig. 7 is a longitudinal sectional view of a modified form of the Fig. 6 device; and Fig. 8 is a section on the line 8—8 of Fig. 6.

Figure 1:
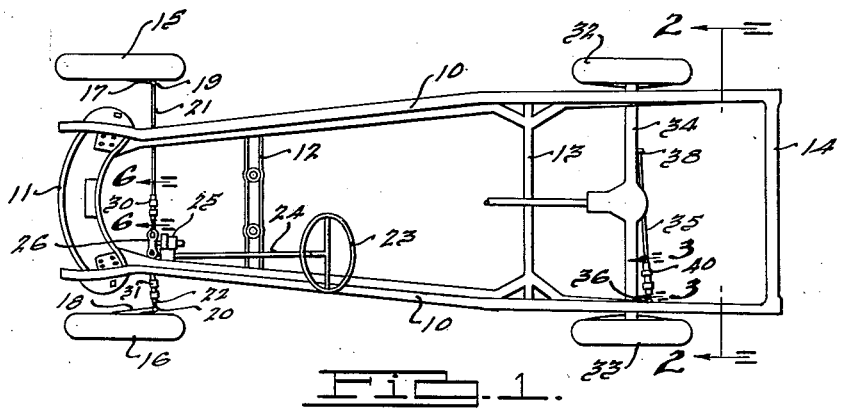
Fig. 1 is a horizontal view of a portion of an automobile chassis showing the places that my invention is to be installed.

In the drawings my invention is shown applied to a motor vehicle chassis having longitudinally extending transversely spaced side rails 10 which are connected by transverse members 11, 12, 13, and 14. The front road wheels 15 and 16 are each rotatably mounted on a suitable steering knuckle spindle (not shown) swivelled about a suitable king pin (not shown) for steering movement. The road wheels 15 and 16 may be supported for independent rising and falling movement by suitable means well known in the art.

The front road wheels 15 and 16 have rearwardly extending steering arms 17 and 18 respectively having jointed connections 19 and 20 with the tie rods 21 and 22, respectively. The usual steering wheel 23 operates a shaft (not shown) disposed in the housing 24. This shaft operates the usual reduction gearing generally indicated at 25 to oscillate or swing the pitman arm 26 in the well known manner for imparting steering movements to the wheels 15 and 16. Two shock absorbers 30 and 31 to be described herein are assembled as integral parts of the tie rods.

The rear road wheels 32 and 33 are mounted on a rear axle contained in housing 34 and sprung from the frame side rails 10 in the usual manner. The spring structure is not shown herein. A stabilizer strut 35 is rotatably mounted at 36 on bracket 37 fixed to frame side rail 10. The other end of strut 35 is rotatably mounted on rear axle housing 34 at 38. Shock absorber 40 is incorporated in the structure of strut 35.

The resistance to relative movement between two members is effected in my shock absorber by the friction between a friction material and the surface of one of the members. Means are provided to keep these contacting surfaces under pressure to increase the friction.

Figure 2:
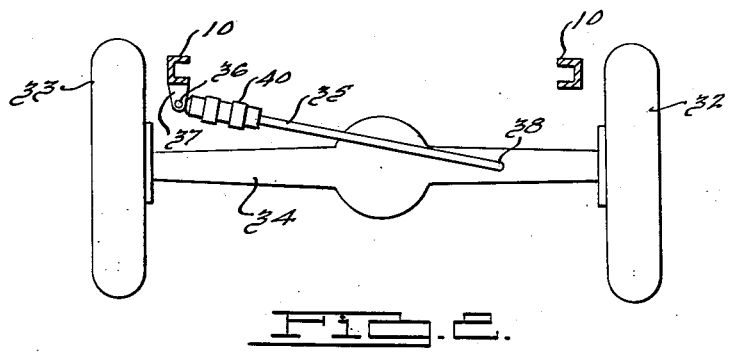
Fig. 2 is a section on the line 2—2 of Fig. 1.
Figure 3:
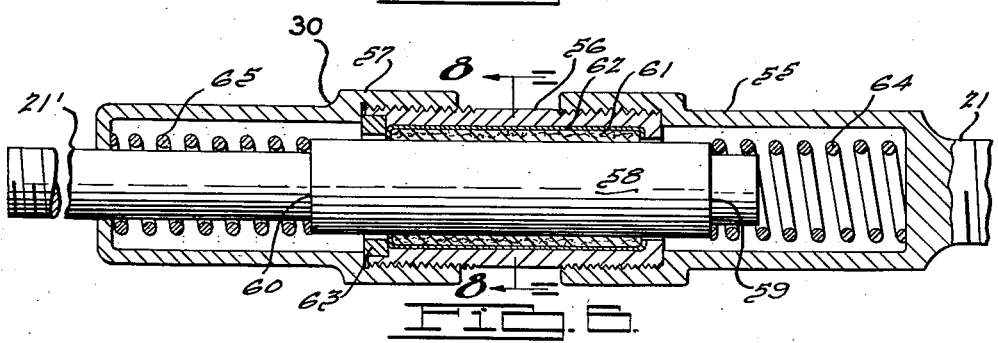
Fig. 3 is a section on the line 3—3 of Fig. 1 showing a construction of shock absorber used in the stabilizer strut.
Figure 4:
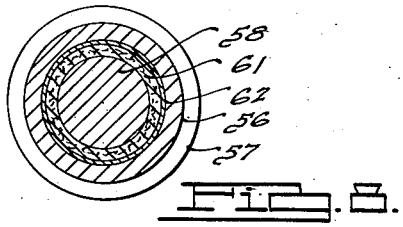
Fig. 4 is a modified form of the Fig. 3 device shown in a longitudinal sectional view.

Figs. 3, 4, and 5 illustrate the construction of the shock absorber 40 as used in the stabilizer strut 35. In Figs. 3 and 5 a housing preferably formed of three elements 41, 42, and 43 for ease of assembly has element 41 rotatably mounted at 36 on bracket 37 of Fig. 2. The strut 35 penetrates the element 43 at the opposite end of the housing from the mounting at 36. Housing element 42 encompasses a fibrous friction material 44 compressed around strut 35 and held within housing element 42 by washer 46. The fibrous friction material is preferably a subassembly held in a metallic case 39. A washer 45, preferably made of rubber or some similar material, is provided in housing element 43 around strut 35 to seal against the entrance of moisture into the housing or into contact with fibrous friction material 44. Longitudinal movement in either direction of strut 35 relative to the housing is possible but resisted by friction. The friction material is preferably compressed around strut 35 with sufficient pressure to require a substantial force to cause relative movement between the housing and the strut 35. The compression may be accomplished by providing a force fit between the friction material and strut 35 whereby the assembly is made with considerable compressive force.

A simplified form of the Fig. 3 device is shown in Fig. 4. Housing 50 preferably drawn from sheet metal is rotatably mounted at 36' on bracket 37 fixed to frame side rail 19. Strut 35' penetrates the opposite end of housing 50. The housing 50 has a crease crimped inwardly around its circumference. This forms a shoulder 52 on the inner wall of housing 50. A washer 51 cooperates with shoulder 52 and the inwardly bent end 53 of housing 50 to hold a quantity of fibrous friction material 44' in housing 50 around strut 35'. Assembly is made with friction material 44' compressed and sufficient pressure between friction material 44' and strut 35' to require a considerable force to impart relative motion between housing 50 and strut 35'.

Figs. 6, 7, and 8 illustrate shock absorbers 30 which have springs added to adapt them for use in the steering mechanism of the vehicle. In the steering mechanism it is necessary that the shock absorber return to a designated position after the movement caused by a bump so that the tie rod length and steering will not be permanently distorted.

In Fig. 6 the tie rod 21 has a housing section 55 formed thereon. Sleeve 56 is threaded thereto and has a second housing section 57 threaded thereon. A rod 21' penetrates the housings and is mounted on pitman arm 26. Rod 21' has a portion 58 having an enlarged diameter and forming shoulders 59 and 60. Enlarged portion 58 of rod 21' has compressed thereon fibrous friction material 61 enveloped in metal case 62. This compression is preferably created at assembly by forcing the rod 21' into position under pressure. Case 62 and friction material 61 are held within sleeve 56 by washer 63. Springs 64 and 65 are disposed in housing sections 55 and 57, respectively. These springs abut their respective housing sections and rod shoulders 59 and 60 and are adapted to return rod 21' to the position illustrated in Fig. 6 relative to housing sections 55, 56, and 57 after the distorting load has been removed therefrom. Movement of rod 21' in the housing is possible, but considerable force is required and the springs return it to its original position.

The incorporation of a device of this nature in the steering tie rods permits a front road wheel to be shocked by road bumps and the motion is dampened and not transmitted through the tie rods to the other front road wheel. A shock absorber is preferably provided in each tie rod.

In Fig. 7 another construction of tie rod shock absorber is illustrated. Tie rod 21 has housing 70 fastened thereto. Housing 70 has a cylinder 71 formed therein and plug 72 sealing the open end of the cylinder. Rod 73 has a piston 74 thereon which is slidably mounted in cylinder 71. Fibrous friction material 75 in metal case 76 is placed in one end of cylinder 71 and surrounds a portion of rod 73. Spring 77 abuts against metal case 76 and piston 74. Spring 78 abuts against the base of housing 70 and the other face of piston 74. Therefore, the fibrous friction material yieldingly resists motion of rod 73 relative to housing 70 and springs 77 and 78 restore piston 74 and rod 73 to their original position when the load is removed. A moisture seal, preferably a rubber gasket 79, surrounds rod 73.

I claim:

1. A device for dampening relative longitudinal motion between two members from an initial position, said device comprising a cylindrical housing having one end thereof affixed to one of said members, a cylindrical rod penetrating the opposite end of said housing, said rod being affixed to the other of said members and having a cylindrical portion within said housing provided with an increased diameter forming an abutment at each end of said portion, a tubular element of fibrous friction material fixed within said housing, encompassing said rod portion and engaging said portion under pressure whereby forced relative movement of said members is resisted by friction, and a spring reacting against each of said abutments and said housing adapted to return said rod to its initial position when the force causing movement is absent.

2. A device for dampening relative longitudinal motion between two members from an initial position, said device comprising a first hollow cylindrical housing section affixed to one of said members and having its opposite end portion internally threaded, a second hollow cylindrical housing section having an internally threaded end portion and an opening in its opposite end portion, an externally threaded sleeve element engaging each of said internally threaded end portions and joining said housing sections in assembled relationship, a cylindrical rod penetrating said opening, said rod being affixed to the other of said members and having a cylindrical portion within said assembled housing sections which is provided with an increased diameter forming an abutment at each end of said portion, a tubular element of fibrous friction material carried by said sleeve and encompassing said rod portion and engaging said portion under pressure whereby forced relative movement of said members is resisted by friction, and a pair of springs each reacting against one of said abutments and one of said housing sections, said springs serving to return said rod to its initial position when the force causing movement is absent.

NATHANIEL WYETH.

REFERENCES CITED

The following references are of record in the file of this patent:

UNITED STATES PATENTS

| Number | Name | Date |
|---|---|---|
| 1,058,758 | Kennedy | Apr. 15, 1913 |
| 1,401,398 | Duncan | Dec. 27, 1921 |
| 1,703,592 | Paton | Feb. 26, 1929 |
| 1,713,515 | Bechereau | May 21, 1929 |
| 2,139,666 | Bogart | Dec. 13, 1938 |
| 2,373,508 | Snyder | Apr. 10, 1945 |

FOREIGN PATENTS

| Number | Country | Date |
|---|---|---|
| 416,857 | Great Britain | Sept. 24, 1934 |
| 706,328 | France | Mar. 30, 1931 |